(12) United States Patent
Matsumoto (10) Patent No.: US 9,939,013 B2
(45) Date of Patent: Apr. 10, 2018

(54) LINEAR MOTION GUIDE DEVICE (71) Applicant: NSK Ltd., Shinagawa-ku, Tokyo (JP)

(72) Inventor: Jun Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/128,255

(22) PCT Filed: Mar. 26, 2015

(86) PCT No.: PCT/JP2015/001740
§ 371 (c)(1),
(2) Date: Sep. 22, 2016

(87) PCT Pub. No.: WO2015/151478
PCT Pub. Date: Oct. 8, 2015

(65) Prior Publication Data
US 2017/0089388 A1  Mar. 30, 2017

(30) Foreign Application Priority Data
Apr. 1, 2014 (JP) .................................. 2014-075578

(51) Int. Cl.
*F16C 29/06* (2006.01)

(52) U.S. Cl.
CPC ...... *F16C 29/0609* (2013.01); *F16C 29/0647* (2013.01); *F16C 2208/66* (2013.01);
(Continued)

(58) Field of Classification Search
CPC .............. F16C 29/0609; F16C 29/0607; F16C 2208/66; F16C 2220/04; F16C 2220/66
(Continued)

(56) References Cited

U.S. PATENT DOCUMENTS 4,582,369 A * 4/1986 Itoh ..................... F16C 29/0607
                                                             384/13
6,024,490 A * 2/2000 Shirai ................. F16C 29/0609
                                                             384/13
(Continued)

FOREIGN PATENT DOCUMENTS

JP      11-264414 A      9/1999
JP      2002-155936 A    5/2002
(Continued)

OTHER PUBLICATIONS

International Search Report (PCT/ISA/210) issued in PCT Application No. PCT/JP2015/001740 dated Jun. 23, 2015 with English translation (five pages).
(Continued)

*Primary Examiner* — Marcus Charles
(74) *Attorney, Agent, or Firm* — Crowell & Moring LLP (57) ABSTRACT

Provided is a linear motion guide device that is less noisy and excellent in operability. A concave groove of a return guide and a raceway groove of a slider are not smoothly continued at a connection portion therebetween, where a stepped portion is formed. At a groove bottom portion of the raceway groove of the slider and the neighboring portion thereof, the surface of the raceway groove of the slider is located to be closer to a curvature center of the raceway groove of the slider than the surface of the concave groove of the return guide is. At a groove shoulder portion of the raceway groove of the slider and the neighboring portion thereof, the surface of the concave groove of the return guide is located to be closer to the curvature center of the raceway groove of the slider than the surface of the raceway groove of the slider is.

4 Claims, 10 Drawing Sheets

(52) U.S. Cl.
CPC ...... *F16C 2220/04* (2013.01); *F16C 2220/66* (2013.01); *F16C 2240/30* (2013.01)

(58) Field of Classification Search
USPC .................................. 384/13, 15, 43–45, 49
See application file for complete search history.

(56) References Cited

U.S. PATENT DOCUMENTS

| | | | | |
|---|---|---|---|---|
| 6,082,899 | A * | 7/2000 | Suzuki | F16C 29/0609 184/5 |
| 7,437,831 | B2 * | 10/2008 | Hayashi | F16C 29/008 33/1 M |
| 7,556,430 | B2 * | 7/2009 | Wu | F16C 29/0609 184/5 |
| 7,614,790 | B2 * | 11/2009 | Liu | F16C 29/0609 184/13.1 |
| 7,819,584 | B2 * | 10/2010 | Michioka | F16C 29/0647 384/13 |
| 7,828,039 | B2 * | 11/2010 | Starzmann | B60J 1/2019 160/370.22 |
| 7,862,234 | B2 * | 1/2011 | Kuwabara | F16C 29/0609 384/13 |
| 7,909,512 | B2 * | 3/2011 | Kuwabara | F16C 29/065 184/5 |
| 8,167,492 | B2 * | 5/2012 | Natale | F16C 29/0609 384/13 |
| 8,366,320 | B2 * | 2/2013 | Vogelgesang | F16C 33/6648 384/13 |
| 8,641,280 | B2 * | 2/2014 | Shibuya | F16C 29/065 384/13 |
| 2002/0067869 | A1 | 6/2002 | Michioka et al. | |
| 2005/0213856 | A1 | 9/2005 | Geka et al. | |

FOREIGN PATENT DOCUMENTS

| | | |
|---|---|---|
| JP | 2005-273765 A | 10/2005 |
| JP | 2006-250166 A | 9/2006 |
| JP | 2007-170558 A | 7/2007 |

OTHER PUBLICATIONS

Japanese-language Written Opinion (PCT/ISA237) issued in PCT Application No. PCT/JP2015/001746 dated Jun. 23, 2015 (three pages).

International Preliminary Report on Patentability (PCT/IB/338 & PCT/IB/373) issued in PCT Application No. PCT/JP2015/001740 dated Oct. 13, 2016, including English translation of document C2 (Japanese-language Written Opinion (PCT/ISA/237)) previously filed on Sep. 22, 2016 (six pages).

* cited by examiner

COLLISION AGAINST GROOVE SHOULDER PORTION OF CONCAVE GROOVE OF RETURN GUIDE

LINEAR MOTION GUIDE DEVICE

CROSS-REFERENCE TO RELATED APPLICATIONS

This application is a national stage application of International Application No. PCT/JP2015/001740, filed Mar. 26, 2015, which claims priority to Japanese Patent Application No. JP 2014-075578, filed Apr. 1, 2014, the entire disclosures of which are herein expressly incorporated by reference.

TECHNICAL FIELD

The present disclosure relates to a linear motion guide device.

BACKGROUND ART

An example of conventional linear motion guide devices is described as follows. On a guide rail having a substantially rectangular sectional shape and extending linearly, a slider is assembled so as to be movable in a longitudinal direction of the guide rail. The slider includes a concave portion, has a substantially U-shaped section, and is assembled into the guide rail so that an upper part of the guide rail is housed in the concave portion. On both side faces of the guide rail is formed a raceway groove having an arc-shaped section and extending in the longitudinal direction, and on inner side faces (an inner surface of the concave portion) of the slider facing the side faces of the guide rail is formed a raceway groove having an arc-shaped section facing the raceway groove of the guide rail.

Then, between each raceway groove of the guide rail and each raceway groove of the slider is formed a rolling passage in which balls that are rolling members roll, and the rolling passage extends in the longitudinal direction. Plural balls are rollably loaded in the rolling passage, and the slider is movable in the longitudinal direction while being guided by the guide rail via rolling of the plurality of balls in the rolling passage.

In addition, the slider is includes a slider main body and an end cap detachably mounted at both ends of the slider main body (which are both ends in the longitudinal direction, and can also be referred to as both ends in a moving direction of the slider), and the raceway grooves of the slider are formed on inner side faces of the slider main body. The slider further includes, inside the slider main body, return passages including straight holes parallel to the rolling passages and passing through in the longitudinal direction.

On the other hand, on a back surface of the end cap (a surface abutting the slider main body) is formed a direction changing passage curved in an arc shape. More specifically, a direction changing passage concave portion is formed on the surface abutting the slider main body, and a semicylindrical return guide is fitted into the direction changing passage concave portion. On a radially outer surface of the return guide, a concave groove having an arc-shaped section that serves as a guide face for the balls is formed in a semicircular shape, and the direction changing passage is formed by the guide face of the return guide and an inner surface of the direction changing passage concave portion.

When the above-described end caps are mounted to the slider main body, the rolling passage and the return passage are communicated by the direction changing passages. The return passage and the direction changing passages at both ends constitute a rolling member conveying passage that conveys and circulates the balls from an end point to a start point of the rolling passage. The rolling passage and the rolling member conveying passage constitute a substantially looped circulation route.

When the slider assembled into the guide rail moves in the longitudinal direction along the guide rail, the balls loaded in the rolling passage move in the same direction as the slider with respect to the guide rail while rolling in the rolling passage. Then, the balls having reached the end point of the rolling passage are scooped up from the rolling passage and sent to the direction changing passage. The balls having entered into the direction changing passage are caused to make a U-turn, are introduced into the return passage, and reach the direction changing passage on the opposite side through the return passage. Here, the balls make a U-turn again and return to the start point of the rolling passage, thereby endlessly repeating such a circulation in the circulation route.

The guide face of the return guide is arranged so as to be connected to the raceway groove of the slider. However, in the linear motion guide device disclosed in PLT 1, a stepped portion is formed at a connection portion between the guide face of the return guide and the raceway groove of the slider. Then, the stepped portion is formed by positioning the guide face of the return guide to be closer to a curvature center of the raceway groove of the slider than a surface of the raceway groove of the slider is.

With such a configuration, the balls do not collide against the ends (end faces) in the longitudinal direction of the slider main body made of a metal such as steel. Thus, sliding resistance and noise can be reduced.

CITATION LIST

Patent Literature

PLT 1: JP 2002-155936 A
PLT 2: JP H11-264414 A

SUMMARY

Technical Problems

However, the technique disclosed in PLT 1 has the following drawbacks. Specifically, the balls entering from the rolling passage into the direction changing passage may collide against an end face of the return guide, and smooth circulation of the balls is hindered.

PLT 2 discloses a technique in which, in order to eliminate a stepped portion formed at a connection portion between a guide face of a return guide and a raceway groove of a slider, a cutting process is performed on the connection portion between the return guide and a slider main body after mounting the return guide to the slider main body, so that the connection portion between the guide face of the return guide and a surface of the raceway groove of the slider is made flush with each other. However, in the technique disclosed in PLT 2, due to a need for a post-process, the number of steps for manufacturing has possibly increased, leading to increase in manufacturing cost.

Thus, the present invention has been made to address the drawbacks of the conventional techniques as described above, and it is an object of the present invention to provide a linear motion guide device that is low in noise and that has an excellent operability.

SUMMARY OF THE INVENTION

In order to address the drawbacks, a linear motion guide device according to one aspect of the present invention includes: a guide rail; a slider; and a plurality of balls that are rolling members. Each of the guide rail and the slider includes a raceway groove having an arc-shaped section at a position facing each other, the raceway groove forming a rolling passage for the balls, both of the raceway grooves extend in a longitudinal direction of the guide rail, the balls are disposed in the rolling passage; the slider is guided by the guide rail to be movable in the longitudinal direction via rolling of the balls in the rolling passage, and the slider includes: a slider main body in which the raceway groove of the slider and a return passage for the balls are provided, the return passage being formed by a through hole substantially parallel to the raceway groove, an end cap in which a direction changing passage communicating the rolling passage with the return passage is formed and which is detachably fixed to both ends in the longitudinal direction of the slider main body, and a return guide made of resin fitted into a direction changing passage concave portion formed on a surface of the end cap abutting the slider main body to form the direction changing passage by a guide face for the balls formed on an outer surface thereof and an inner surface of the direction changing passage concave portion, so as to convey and circulate the balls on the return passage and the direction changing passage from an end point to a start point of the rolling passage, and the guide face of the return guide and the raceway groove of the slider are not smoothly continued at a connection portion, and a stepped portion is formed, at a groove bottom portion of the raceway groove of the slider and a neighboring portion, a surface of the raceway groove of the slider is located to be closer to a curvature center of the raceway groove of the slider than the guide face of the return guide is, and at a groove shoulder portion of the raceway groove of the slider and a neighboring portion, the guide face of the return guide is located to be closer to the curvature center of the raceway groove of the slider than the surface of the raceway groove of the slider is.

In other words, the linear motion guide device according to the one aspect is as follows. That is, a linear motion guide device according to one aspect of the invention is a linear motion guide device that includes a guide rail, a slider, and plural balls that are rolling members, in which the guide rail and the slider respectively include a raceway groove having an arc-shaped section at a position facing each other, the raceway groove forming a rolling passage for the balls; the raceway grooves both extend in a longitudinal direction of the guide rail; the balls are disposed in the rolling passage; and the slider is guided by the guide rail to be movable in the longitudinal direction via rolling of the balls in the rolling passage, wherein the device is characterized in that the slider includes a slider main body in which there are formed the raceway groove of the slider and a return passage for the balls formed by a through hole substantially parallel to the raceway groove; an end cap in which a direction changing passage communicating between the rolling passage and the return passage is formed and which is detachably fixed to both ends in the longitudinal direction of the slider main body; and a return guide made of resin fitted into a direction changing passage concave portion formed on a surface of the end cap abutting the slider main body to form the direction changing passage by a guide face for the balls formed on an outer surface thereof and an inner surface of the direction changing passage concave portion, so as to convey and circulate the balls by the return passage and the direction changing passage from an end point to a start point of the rolling passage; and the guide face of the return guide and the raceway groove of the slider are not smoothly continued at a connection portion therebetween, and a stepped portion is formed, in which at a groove bottom portion of the raceway groove of the slider and a neighboring portion thereof, a surface of the raceway groove of the slider is located to be closer to a curvature center of the raceway groove of the slider than to the guide face of the return guide, and at a groove shoulder portion of the raceway groove of the slider and a neighboring portion thereof, the guide face of the return guide is located to be closer to the curvature center of the raceway groove of the slider than to the surface of the raceway groove of the slider.

In the linear motion guide device, a chamfer may be formed at a corner portion continuing in an arc shape formed at the longitudinal ends of the raceway groove of the slider. In addition, a curvature center of the arc-shaped chamfer may be located at a position farther from the groove bottom portion of the raceway groove of the slider than from the curvature center of the raceway groove of the slider. Additionally, the chamfer may be formed by a cutting process using a conical cutting tool, and may be formed by contacting a cutter part formed at a side face portion of the cutting tool with the corner portion.

Advantageous Effects

The linear motion guide device of the present invention is low in noise and is excellent in operability.

DESCRIPTION OF EMBODIMENTS

Embodiments of a linear motion guide device in the present invention will be described in detail with reference to the drawings. In addition, in each drawing referred to in the description hereinafter, identical or corresponding portions are denoted by the same reference signs. Additionally, in the description hereinafter, when referring to "section", it means a section as cut along a plane orthogonal to the longitudinal direction of a guide rail unless otherwise specified. Furthermore, for descriptive convenience, the terms indicating directions such as "upper", "lower", "left", and "right" in the description hereinafter mean the respective directions in FIG. 2 unless otherwise specified.

On a guide rail 1 having a substantially rectangular sectional shape and extending linearly, a slider 2 having a substantially U-shaped sectional shape is assembled so as to be movable in a longitudinal direction of the guide rail 1. At ridges where both right and left side faces 1a in a widthwise direction of the guide rail 1 intersect with an upper surface 1b thereof is formed a raceway groove 10 formed by a concave groove having a substantially ¼ arc-shaped section and extending in the longitudinal direction.

In addition, at substantially center portions in a vertical direction of both the right and left side faces 1a in the widthwise direction of the guide rail 1 is formed a raceway groove 10 including a concave groove having a substantially semicircular section and extending in the longitudinal direction. Then, at groove bottom portions of the raceway grooves 10 formed at the substantially center portions in the vertical direction of both the right and left side faces 1a in the widthwise direction of the guide rail 1, a holder groove 10a (a wire groove) for housing a part of a holder 4 and guiding the holder 4 during movement of the slider 2 is formed along the longitudinal direction over a range between both ends of a movement region of the slider 2 (for example, between both ends in the longitudinal direction of the guide rail 1). The holder groove 10a has a sectional shape that is, for example, a substantially rectangular shape.

Additionally, the slider 2 includes a plate-shaped trunk portion 7 facing the upper surface 1b of the guide rail 1 and two leg portions 6 respectively extending downward from both right and left sides of the trunk portion 7 and facing the side face 1a, and an angle made by the trunk portion 7 and the leg portion 6 is substantially right-angled, as a result of which the sectional shape of the slider 2 is substantially U-shaped. Then, the slider 2 is movably mounted to the guide rail 1 in such a manner as to sandwich the guide rail 1 between both the leg portions 6.

The above-described slider 2 includes a slider main body 2A and an end cap 2B detachably mounted to both ends of the slider main body 2A (which are both ends in the longitudinal direction and can also be referred to as both ends in a movement direction of the slider 2). Furthermore, at both ends of the slider 2 (on an outer end face of each end cap 2B in the longitudinal direction) is attached a side seal 5 that is slidingly contacted with the outer surfaces (the upper surface 1b and the side surfaces 1a) of the guide rail 1 to seal off portions facing end face sides in the longitudinal direction in an opening of a gap between the guide rail 1 and the slider 2, and at lower sides of the slider 2 is an under seal 8 that seals off portions facing lower surface sides of the slider 2 in the opening of the gap between the guide rail 1 and the slider 2. The side seal 5 and the under seal 8 prevent entry of foreign matter from the outside into the gap and leakage of a lubricant from the gap to the outside.

Furthermore, at corner portions of inner side faces and at substantially center portions thereof in the vertical direction of both the right and left leg portions 6 of the slider main body 2A is formed a raceway groove 11 formed by a concave groove having a substantially semicircular section and facing the raceway groove 10 of the guide rail 1. Then, between the raceway groove 10 of the guide rail 1 and the raceway groove 11 of the slider 2 is formed each rolling passage 13 having a substantially circular section. The rolling passage 13 extends in the longitudinal direction.

In these rolling passages 13, plural rolling members 3 (balls) are rollably loaded while being held by a holder 4. The slider 2 is guided by the guide rail 1 to be movable in the longitudinal direction via rolling of the rolling members 3 in the rolling passages 13. The holder 4 is made of, for example, a wire, and holds the rolling members 3 in order to prevent them from falling off from the slider 2 before being assembled into the guide rail 1.

In addition, the numbers of the raceway grooves 10 and 11 provided in the guide rail 1 and the slider 2 are not limited to two lines on one side. For example, one line or three or more lines may be arranged on one side. Additionally, the sectional shape of the raceway grooves 10 and 11 may be the arc shape made of a single arc, as mentioned above, or may be a substantially V shape formed by combining two arcs having different curvature centers (Gothic arc-shaped grooves).

Figure 1:
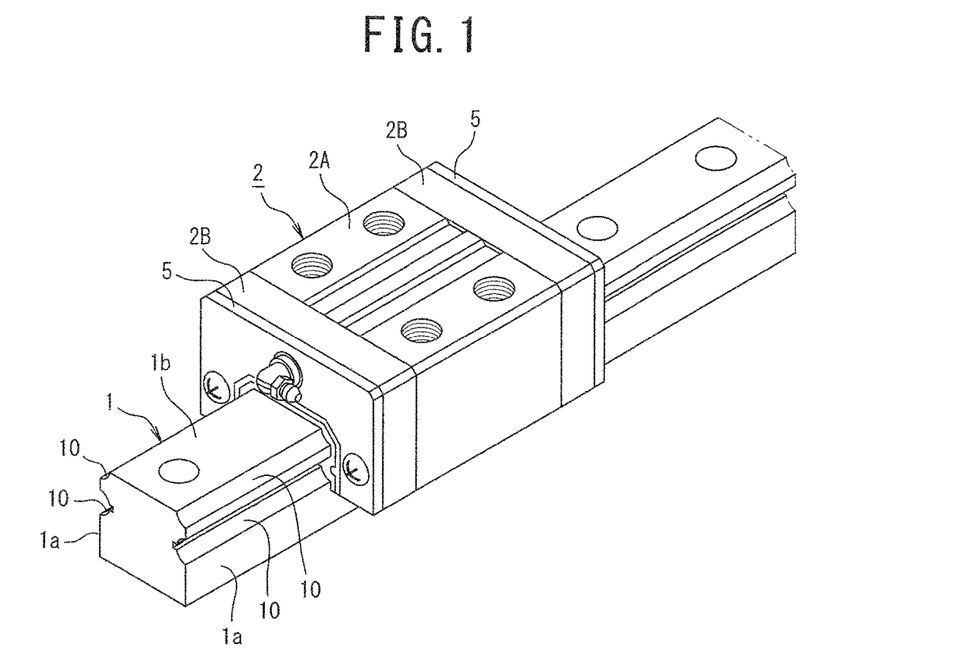
FIG. 1 is a perspective view of a configuration of a linear motion guide device according to one embodiment of the present invention.
Figure 2:
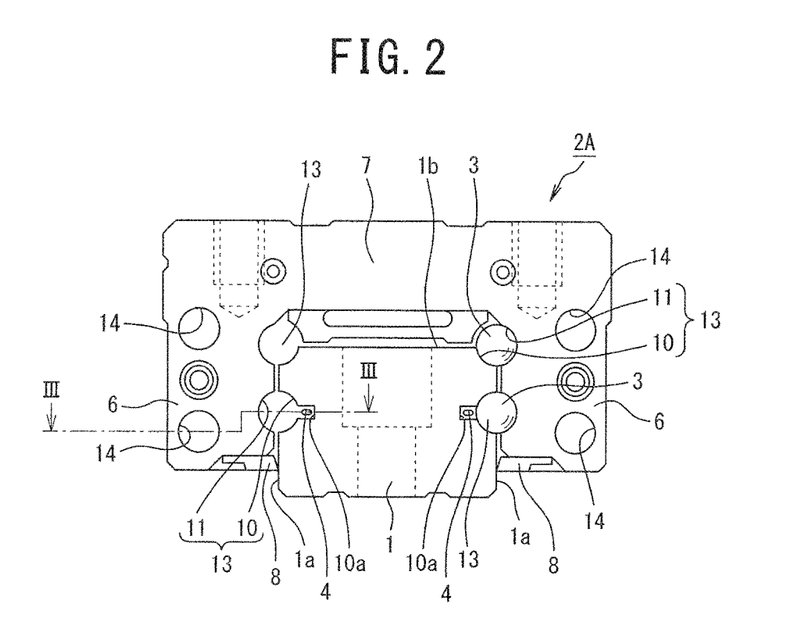
FIG. 2 is a front view of the linear motion guide device of FIG. 1 as viewed from a longitudinal direction of a guide rail (provided that an end cap is omitted from the drawing)
Figure 3:
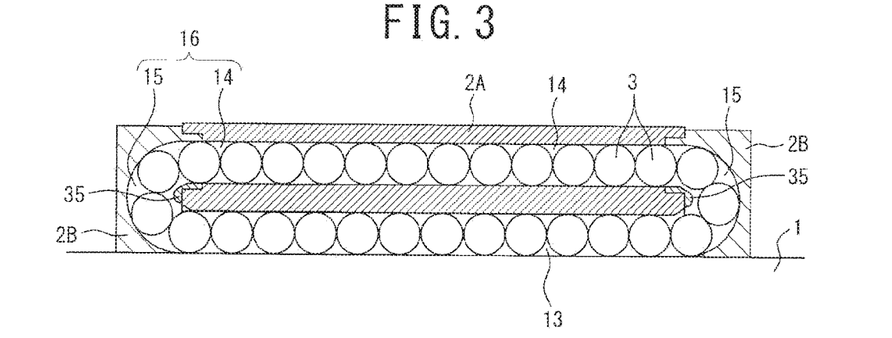
FIG. 3 is a sectional view taken along line of the linear motion guide device of FIG. 2.

Furthermore, the slider 2 includes a return passage 14 formed by a through hole having a substantially circular sectional shape parallel to the rolling passage 13 and passing through in the longitudinal direction, at upper and lower portions of thick parts of both the right and left leg portions 6 of the slider main body 2A (see FIGS. 2 and 3).

On the other hand, the end cap 2B is made of, for example, a molded article of a resin material, and the sectional shape thereof is formed into a substantially U shape. In addition, on both right and left sides of a back surface of the end cap 2B (a surface abutting the slider main body 2A), a direction changing passage 15 having a circular sectional shape and curved in an arc shape is formed in upper and lower two stages (see FIG. 3). When the above-described end cap 2B is mounted to the slider main body 2A by a fastening member such as a screw, the rolling passage 13 and the return passage 14 are communicated by the direction changing passage 15. In addition, the sectional shape of the direction changing passage 15 is a sectional shape as cut along a plane orthogonal to a direction continuous with the direction changing passage 15.

The return passage 14 and the direction changing passage at both ends constitute a rolling member conveying passage 16 that conveys and circulates the rolling members 3 from an end point to a start point of the rolling passage 13 (the number of the rolling member conveying passages 16 provided is the same as that of the rolling passages 13), and the rolling passage 13 and the rolling member conveying passage 16 constitute a substantially looped circulation route (see FIG. 3). Then, the substantially looped circulation route is formed on both right and left sides with the guide rail 1 being interposed therebetween.

When the slider 2 assembled into the guide rail 1 moves in the longitudinal direction along the guide rail 1, the rolling members 3 loaded in the rolling passage 13 move in the same direction as the slider 2 with respect to the guide rail 1, while rolling in the rolling passage 13. Then, when the rolling members 3 reach the end point of the rolling passage 13, the rolling members 3 are scooped up from the rolling passage 13 and sent to the direction changing passage 15. The rolling members 3 having entered into the direction changing passage 15 are caused to make a U-turn, are introduced to the return passage 14, and reach the direction changing passage 15 on the opposite side through the return passage 14. Here, the rolling members 3 again make a U-turn and return to the start point of the rolling passage 13, thereby endlessly repeating such a circulation in the circulation route.

Figure 4:
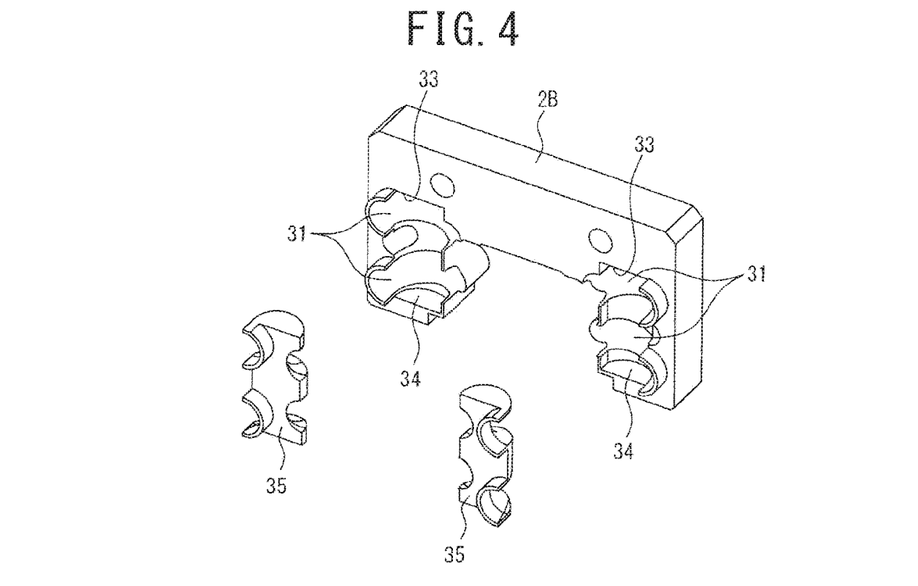
FIG. 4 is perspective views of an end cap and a return guide before being mounted.

Now, the end cap 2B (particularly, the back surface thereof) will be described in more detail. On the surface (the back surface) of the end cap 2B abutting the slider main body 2A, as depicted in FIG. 4, a semicircular concave portion 31 is formed at upper and lower sides of both the right and left arm portions 6, and a semicylindrical return guide fitting concave portion 33 is provided crossing the centers of both the semicircular concave portions 31. The concave portions 31 and the return guide fitting concave portion 33 constitute a direction changing passage concave portion 34.

Figure 5:
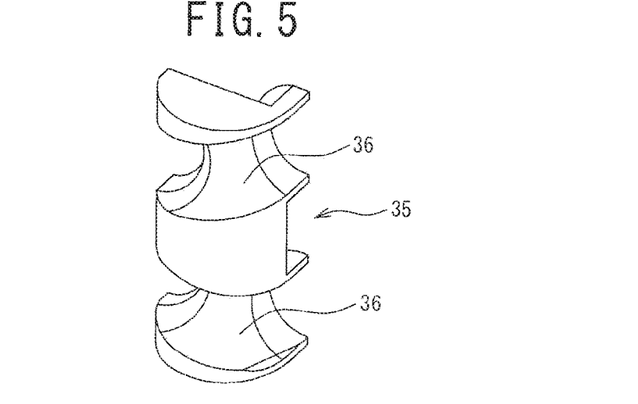
FIG. 5 is a perspective view of the return guide.

Then, a semicircular return guide 35 (see FIGS. 4 and 5) obtained by injection molding a resin material (for example, a polyacetal resin) is fitted into the semicircular return guide fitting concave portion 33. On a radially outer surface of the return guide 35, as depicted in FIG. 5, a concave groove 36 having an arc-shaped section that serves as a guide face for the rolling members 3 is formed continuously in a semicircular shape. In addition, the sectional shape of the concave groove 36 is a sectional shape when it is cut along a plane orthogonal to a direction continuous with the concave groove 36.

Figure 6:
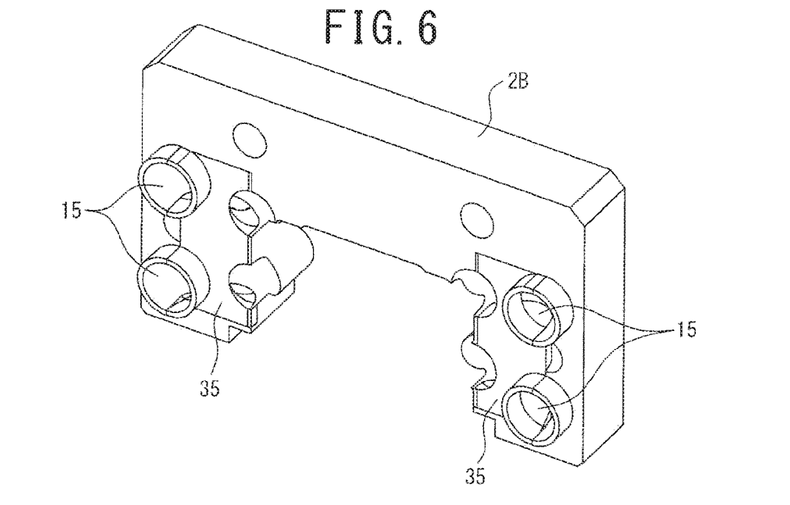
FIG. 6 is a perspective view of the end cap after mounting the return guide.

The above-described return guide 35 is fitted into the return guide fitting concave portion 33 in such a manner that the radially outer surface having the concave groove 36 formed thereon faces inward. Hence, the direction changing passages 15 are formed by the concave grooves 36 of the return guide 35 and the concave portions 31 of the end cap 2B. On both the right and left sides of the back surface of the end cap 2B, the direction changing passage 15 having a circular sectional shape and curved in an arc shape is formed in upper and lower two stages (see FIGS. 3 and 6).

Figure 7:
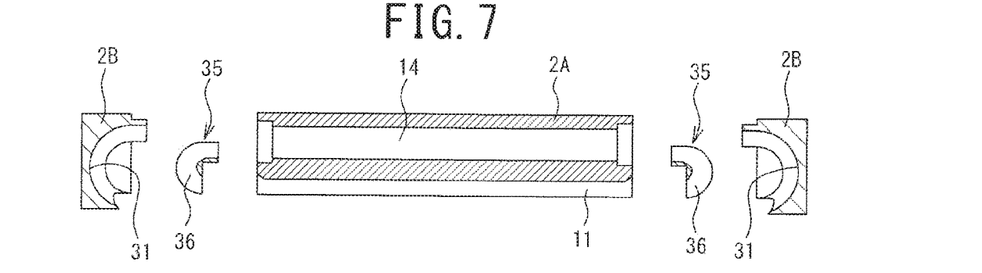
FIG. 7 is an exploded sectional view of the end cap, the return guide, and a slider main body.
Figure 8:
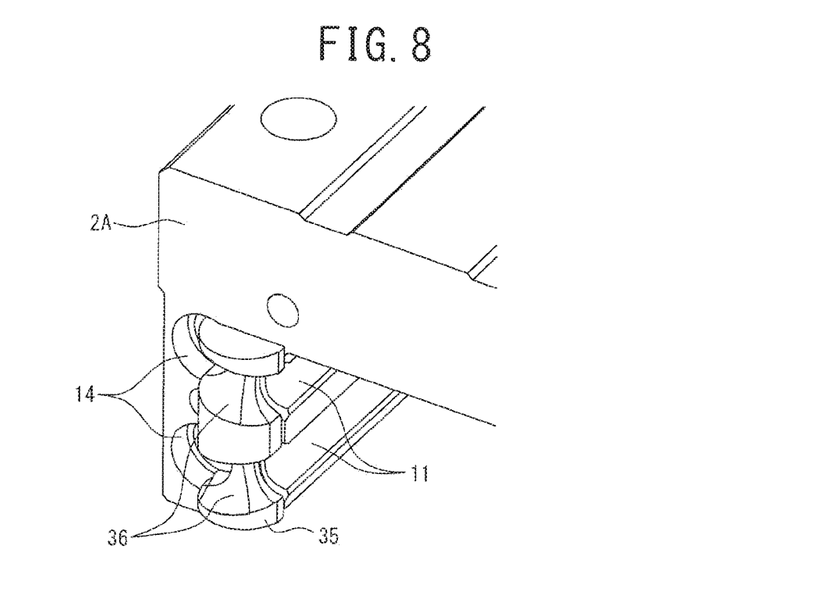
FIG. 8 is a illustrates a positional relationship between the slider main body and the return guide.

When the above-described end cap 2B is assembled into the slider main body 2A (see FIG. 7), the rolling passage 13 and the return passage 14 are communicated by the direction changing passage 15. FIG. 8 illustrates a positional relationship between the slider main body 2A and the return guide 35 in a state where the end cap 2B is assembled into the slider main body 2A. In FIG. 8, illustration of the end cap 2B is omitted.

Figure 9:
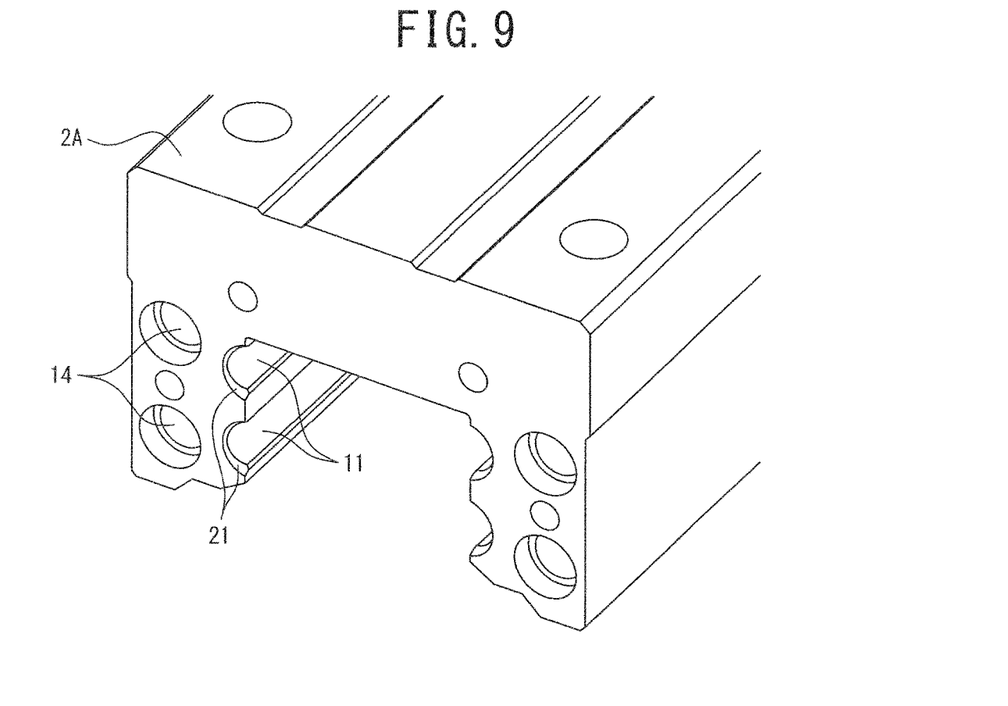
FIG. 9 is a perspective view of the slider main body depicting a chamfer formed at a corner portion at an end of a raceway groove.

In addition, at the longitudinal ends of the raceway groove 11 of the slider main body 2A is formed a corner portion continuing in an arc shape. A chamfer 21 may be formed at the corner portion (see FIG. 9). A method for forming the chamfer 21 is not particularly limited. For example, the chamfer 21 can be formed by a cutting process using a conical cutting tool. A detailed description of the chamfer 21 (such as a description of a method for the cutting process) will be given later.

Figure 10:
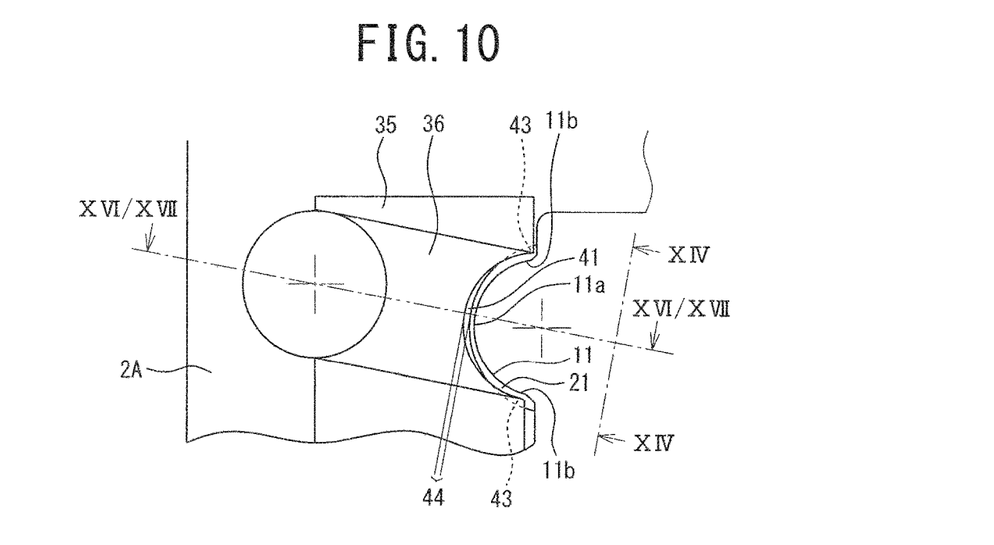
FIG. 10 is an enlarged view of a main part illustrating a stepped portion formed at a connection portion between a concave groove of the return guide and the raceway groove of the slider main body.

The concave groove 36 of the return guide 35 is arranged so as to be connected to the raceway groove 11 of the slider main body 2A, as illustrated in FIG. 8. However, in the linear motion guide device in one embodiment of the present invention, the concave groove 36 of the return guide 35 and the raceway groove 11 of the slider main body 2A are not smoothly continued at a connection portion therebetween, and a stepped portion 44 is formed. Now, the stepped portion 44 will be illustrated. As depicted in FIG. 10, at a groove bottom portion 11a of the raceway groove 11 (in other words, a deepest portion of the raceway groove 11) of the slider 2 and a neighboring portion thereof, a surface of the raceway groove 11 of the slider 2 is located to be closer to a curvature center O of the raceway groove 11 of the slider 2 than a surface of the concave groove 36 of the return guide 35 is. Additionally, at a groove shoulder portion 11b of the raceway groove 11 of the slider 2 and a neighboring portion thereof, the surface of the concave groove 36 of the return guide 35 is located to be closer to the curvature center O of the raceway groove 11 of the slider 2 than the surface of the raceway groove 11 of the slider 2 is.

Figure 11:
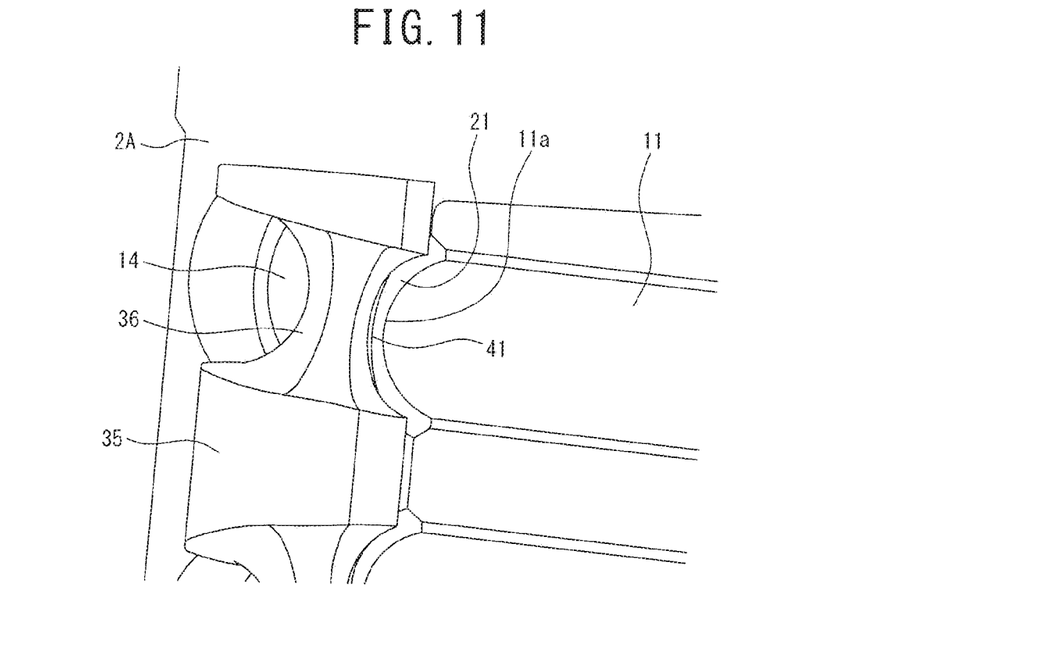
FIG. 11 is an enlarged view of a main part as the connection portion between the concave groove of the return guide and the raceway groove of the slider main body is viewed from a return guide side.

In other words, as depicted in FIG. 11, when the slider main body 2A is viewed from a return guide 35 side, an end face 41 in the longitudinal direction of the slider main body 2A is exposed at the groove bottom portion 11a of the raceway groove 11 (in other words, the deepest portion of the raceway groove 11) of the slider 2 and the neighboring portion thereof. On the other hand, at the groove shoulder portion 11b (see FIG. 10) of the raceway groove 11 of the slider 2 and the neighboring portion thereof, the longitudinal end face 41 of the slider main body 2A is not exposed and cannot be seen.

Figure 12:
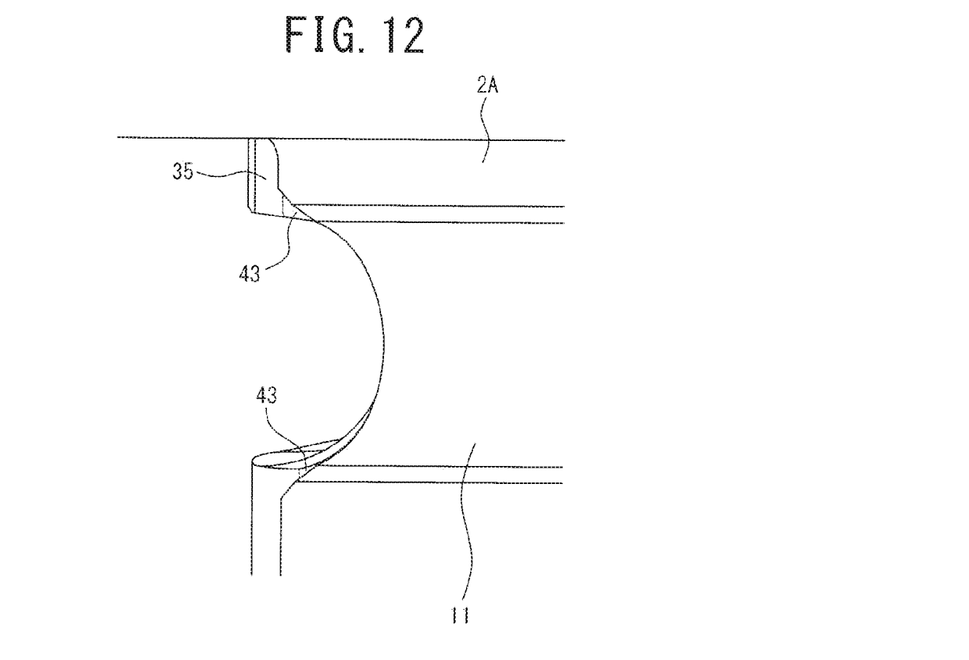
FIG. 12 is an enlarged view of a main part as the connection portion between the concave groove of the return guide and the raceway groove of the slider main body is viewed from a slider main body side.

Then, as depicted in FIG. 12, when the return guide 35 is viewed from a slider main body 2A side, end faces 43 of the return guide 35 are both exposed at both groove shoulder portions 11b (see FIG. 10) of the raceway groove 11 of the slider 2 and the neighboring portion thereof. On the other hand, at the groove bottom portion 11a (see FIG. 10) of the raceway groove 11 of the slider 2 and the neighboring portion thereof, the end faces 43 of the return guide 35 are not exposed and cannot be seen.

Figure 13:
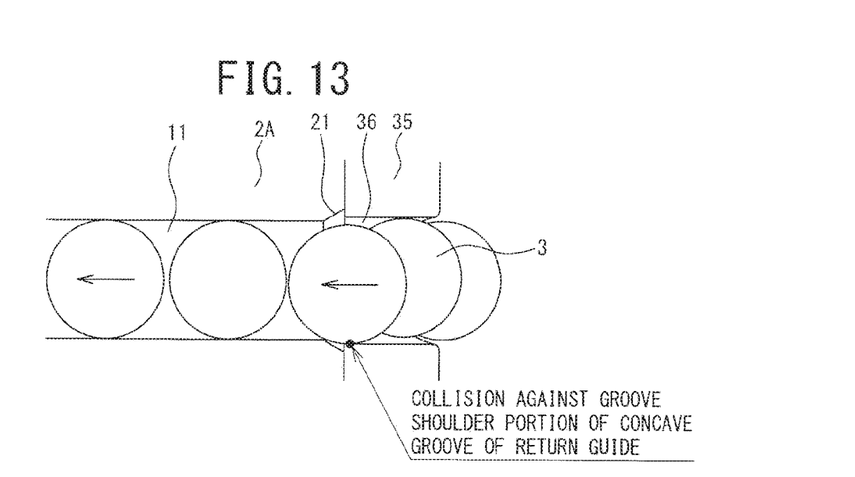
FIG. 13 illustrates a state of rolling members entering from a direction changing passage into a rolling passage.

In the direction changing passage 15, a width of the direction changing passage 15 is made larger than a diameter of the rolling members 3 so that the rolling members 3 can circulate under no load smoothly. Therefore, the rolling members 3 move in the direction changing passage 15 while meandering right and left in a widthwise direction of the concave groove 36. Thus, when the rolling members 3 enter from the direction changing passage 15 into the rolling passage 13, the rolling members 3 tend to collide against a surface of the groove shoulder portion on the surface of the concave groove 36 of the return guide 35 (see FIG. 13).

As described above, however, at the groove shoulder portion 11b of the raceway groove 11 of the slider 2 and the neighboring portion thereof, the surface of the concave groove 36 of the return guide 35 is located on the side closer to the curvature center O of the raceway groove 11 of the slider 2 than the surface of the raceway groove 11 of the slider 2 is. Thus, the rolling members 3 when entering into the rolling passage 13 do not collide against the groove shoulder portion 11b of the raceway groove 11 of the slider main body 2A. Since the return guide 35 is made of a resin, collision is absorbed even if the rolling members 3 collide. Thus, vibration and noise generated are small, and the linear motion guide device in one embodiment of the present invention is smoothly operated. A magnitude Δk (see FIG. 14) of the stepped portion 44 between the surface of the raceway groove 11 of the slider 2 and the surface of the concave groove 36 of the return guide 35 that is formed at the groove shoulder portion 11b (see FIG. 10) of the raceway groove 11 of the slider 2 and the neighboring portion thereof is not particularly limited, but may range from 0.1 mm to 0.5 mm, and, for example, can be 0.3 mm.

Figure 15:
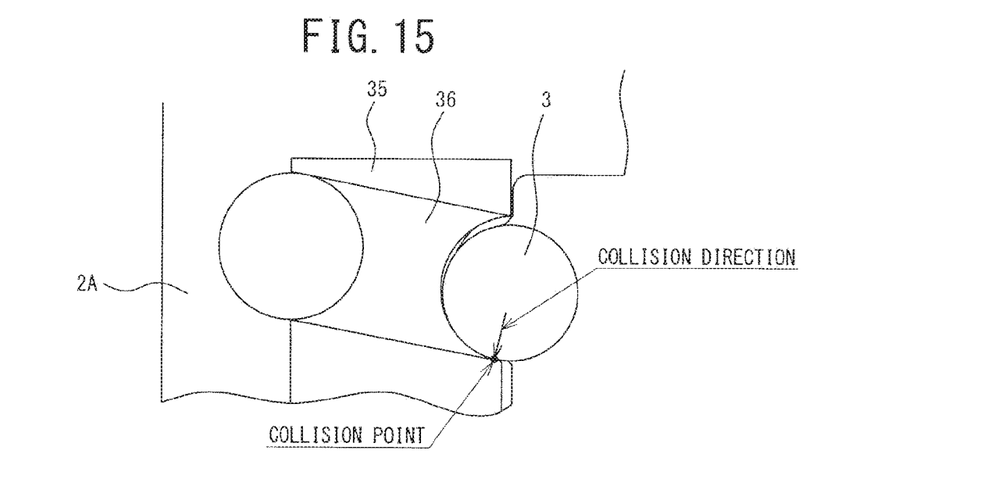
FIG. 15 is a diagram illustrating a state of the rolling member colliding against the concave groove of the return guide.

FIG. 15 illustrates a state of the rolling member 3 colliding against the groove shoulder portion of the concave groove 36 of the return guide 35. However, the portion against which the rolling member 3 collides is not the corner portion of the groove shoulder portion of the concave groove 36 but is at a position slightly closer to the groove bottom portion than the corner portion. Accordingly, load upon collision can be received by the concave surface, so that a contact area between the rolling member 3 and the concave groove 36 upon collision is large and thus contact stress can be reduced. Accordingly, even when collision repeatedly occurs, the return guide 35 is hardly damaged.

Figure 16:
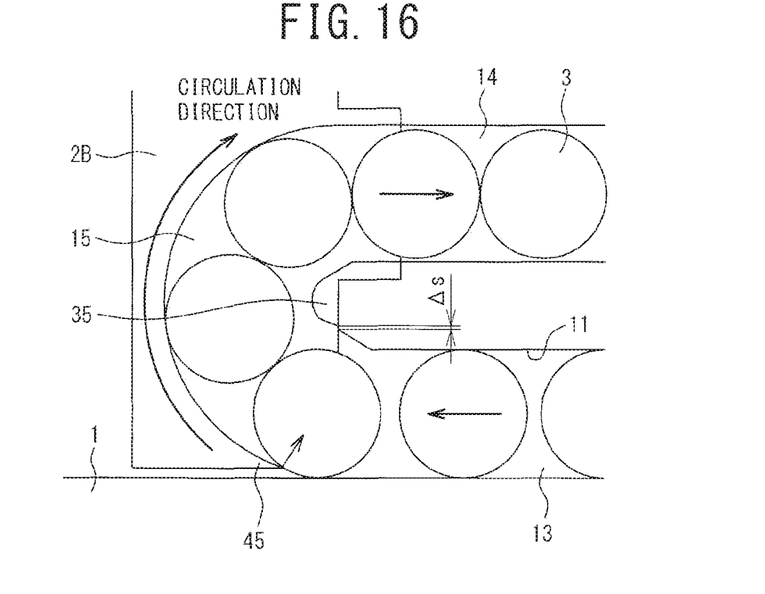
FIG. 16 is a sectional view taken along line XVI/XVII of FIG. 10, and illustrates a state of the rolling members being scooped up from the rolling passage.
Figure 17:
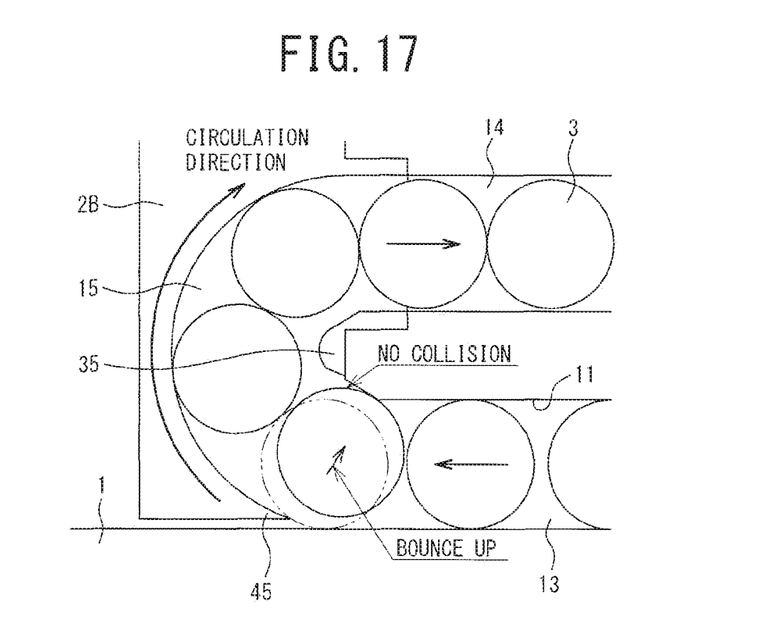
FIG. 17 is a sectional view taken along line XVI/XVII of FIG. 10, and illustrates a state of the rolling members entering from the rolling passage into the direction changing passage.

On the other hand, since the rolling members 3 receive loads in the rolling passage 13, the rolling members 3 do not meander and linearly travel. Then, the rolling member 3 having reached the end point of the rolling passage 13 is scooped up from the rolling passage 13 by a tongue portion provided at the end cap 2B and sent to the direction changing passage 15 (see FIG. 16). At a time when the rolling member 3 is scooped up, the rolling member 3 bounces up by receiving force in a direction oriented inward the direction changing passage 15 (see FIG. 17).

As described above, however, at the groove bottom portion 11a (see FIG. 10) of the raceway groove 11 of the slider 2 and the neighboring portion thereof, the surface of the raceway groove 11 of the slider 2 is located on the side closer to the curvature center O of the raceway groove 11 of the slider 2 than the surface of the concave groove 36 of the return guide 35 is (see FIG. 10). Thus, the rolling members 3 when entering from the rolling passage 13 into the direction changing passage 15 do not collide against the return guide 35 at the groove bottom portion of the concave groove 36 and the neighboring portion thereof (see FIG. 17).

Therefore, the rolling members 3 smoothly move, and vibration and noise are hardly generated, so that the linear motion guide device in one embodiment of the present invention is low in noise and low vibration and is excellent in operability. Additionally, since the rolling members 3 do not collide, the return guide 35 is hardly damaged. Furthermore, the linear motion guide device can be manufactured by merely assembling the slider main body 2A, the end caps 2b, the return guides 35, and the like processed into shapes, and it is unnecessary to perform any post-processing or the like after assembling, so that manufacturing is easy and its manufacturing cost is low.

A magnitude Δs of the stepped portion 44 between the surface of the raceway groove 11 of the slider 2 and the surface of the concave groove 36 of the return guide 35 formed at the groove bottom portion 11a of the raceway groove 11 of the slider 2 and the neighboring portion thereof is not particularly limited, but may range from 0.05 to 0.5 mm, and, for example, can be 0.1 mm.

Now, the above-described chamfer 21 will be described in detail. The corner portions continuing in the arc shape formed at the longitudinal ends of the raceway groove 11 of the slider main body 2A may be chamfered. A method for forming the chamfer 21 by a cutting process using a conical cutting tool 55 will be described below with reference to FIGS. 18 and 19.

Figure 18A:
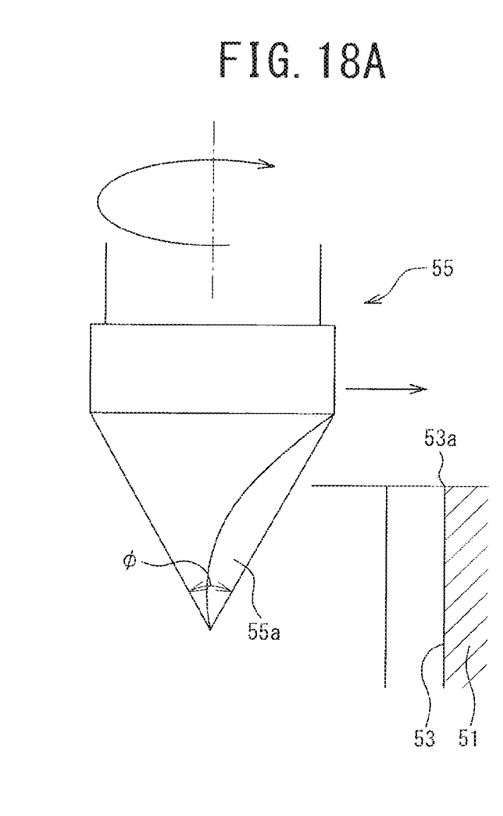
FIG. 18A to FIG. 18D are diagrams of a method for forming a chamfer.
Figure 19:
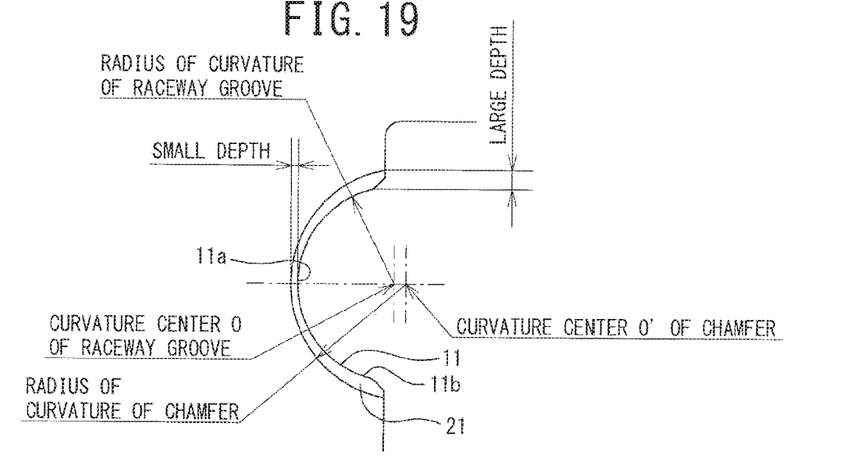
FIG. 19 is an enlarged view of a chamfer, a curvature center of the chamfer, a curvature center of the raceway groove of the slider.

First, a groove 53 that serves as the raceway groove 11 is formed on an inner side face of a steel material 51 having a substantially U-shaped sectional shape. Next, using the conical rotary cutting tool 55, a chamfer is formed at a corner portion 53a formed at an end of the groove 53. As depicted in FIG. 18, the cutting tool 55 has the conical shape, and a cutter part (blade) 55a is formed at a side face portion of the cone. Then, the cutting tool 55 can be rotated around a center axis line of the cone as a rotation axis.

The posture of the cutting tool 55 is set so that the rotation axis is parallel to a direction continuous with the groove 53 and an apex of the cone faces a longitudinal center side of the groove 53, and additionally, the cutting tool 55 is arranged so that a side face of the cone faces an inner surface of the groove 53. Then, while rotating the cutting tool 55, the cutter part 55a formed at the side face portion of the cone is moved close to the end of the groove 53 (see (a) of FIG. 18).

Figure 18B:
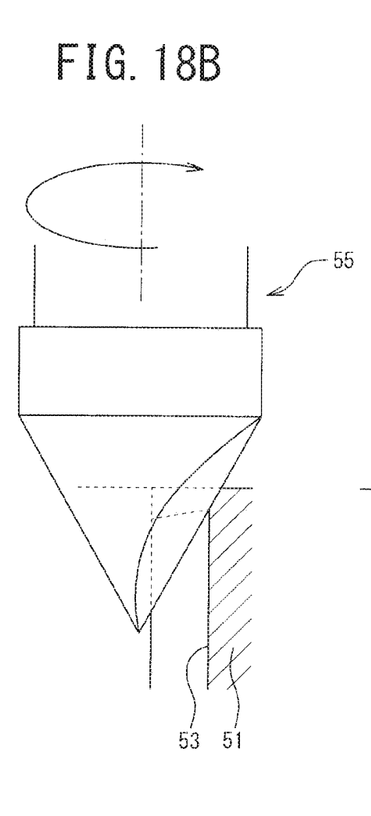
Figure 18C:
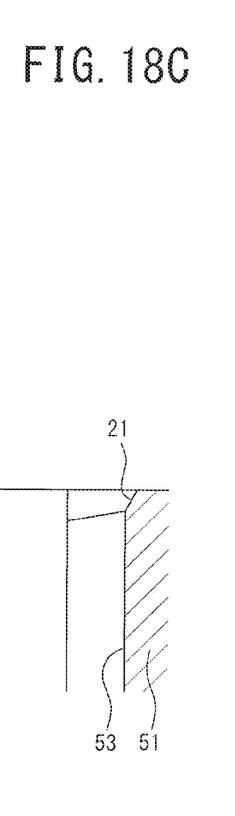

When the cutter part 55a is contacted with the corner portion 53a continuing in an arc shape formed at the end in the direction continuous with the groove 53, the chamfer 21 having an arc shape is formed at the corner portion 53a of the groove 53 (see FIGS. 18(b) and 18(c)). The position of the rotation axis of the cutting tool 55 is a curvature center O' of the arc-shaped chamfer 21. Additionally, the size of the chamfer 21 can be adjusted by adjusting the position of the cutting tool 55 with respect to the groove 53 upon contact (a position thereof in a widthwise direction of the groove 53 and a relative distance between the rotation axis of the cutting tool 55 and the groove 53).

Figure 18D:
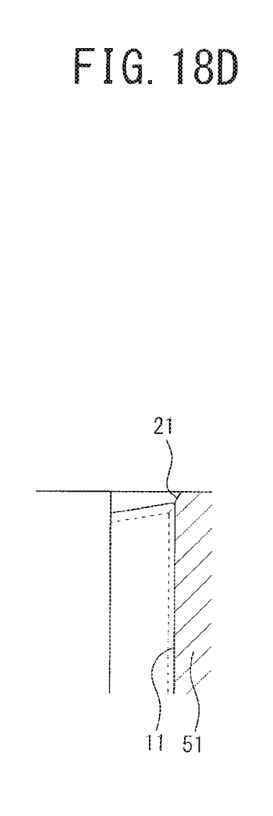

When the cutting process ends, a grinding process is performed on the inner surface of the groove 53 to remove burrs generated at a boundary portion between the inner surface of the groove 53 and the chamfer 21 and obtain a raceway groove 11 (see FIG. 18(d); a broken line in FIG. 18(d) indicates the inner surface of the groove 53 before the grinding process) A processed allowance (an amount of processing) in the grinding process is not particularly limited, but may range from 0.1 to 0.5 mm.

The curvature center O' of the arc-shaped chamfer 21 may be positionally different (i.e., eccentric) from the curvature center O of the completed raceway groove 11. For example, the curvature center O' of the arc-shaped chamfer 21 may be located at a position farther from the groove bottom portion 11a of the raceway groove 11 than from the curvature center O of the raceway groove 11 (see FIG. 19). By eccentrically positioning both curvature centers O and O', a depth of the chamfer 21 can be made small at the groove bottom portion 11a of the raceway groove 11 and the neighboring portion thereof, and can be made large at the groove shoulder portion 11b of the raceway groove 11 and the neighboring portion thereof (see FIG. 19). A distance (an amount of eccentricity) between the curvature center O' of the arc-shaped chamfer 21 and the curvature center O of the raceway groove 11 is not particularly limited, but may range from 0.05 to 0.5 mm, and, for example, can be 0.1 mm.

In addition, an opening angle φ of the cutting tool 55 is not particularly limited, but may range from 40 to 90°, and, for example, can be 60°. Additionally, the opening angle φ means an angle of the apex of the cone as the conical cutting tool 55 is viewed from a side thereof (as viewed from a side face side of the cone) (see FIGS. 14 and 18).

Figure 14:
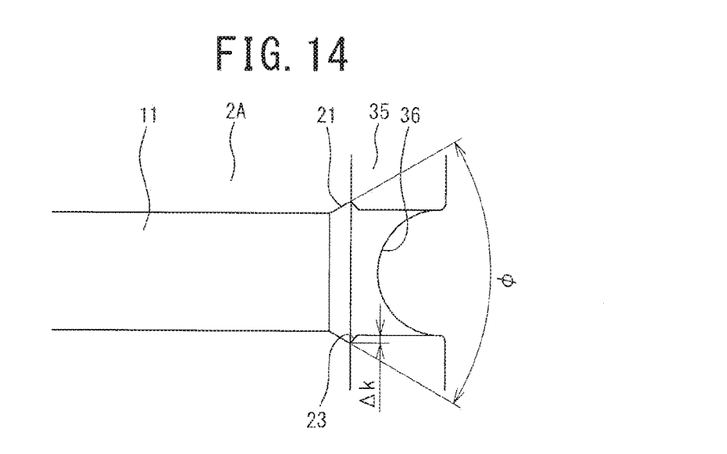
FIG. 14 is an arrow view taken along line XIV-XIV of FIG. 10.

Furthermore, at ends in the direction continuous with the concave groove 36 of the return guide 35 is formed a corner portion continuing in an arc shape, and, at the corner portion may be formed a chamfer 23 (see FIG. 14). The kind of the chamfer may be a so-called R chamfer (a round chamfer). The radius of curvature of the R chamfer is not particularly limited, but may range from 0.1 to 0.5 mm, and, for example, can be 0.1 mm.

Next, in order to illustrate excellent advantages of the linear motion guide device in some embodiments of the present invention, Comparative Examples will be provided as follows.

Figure 20:
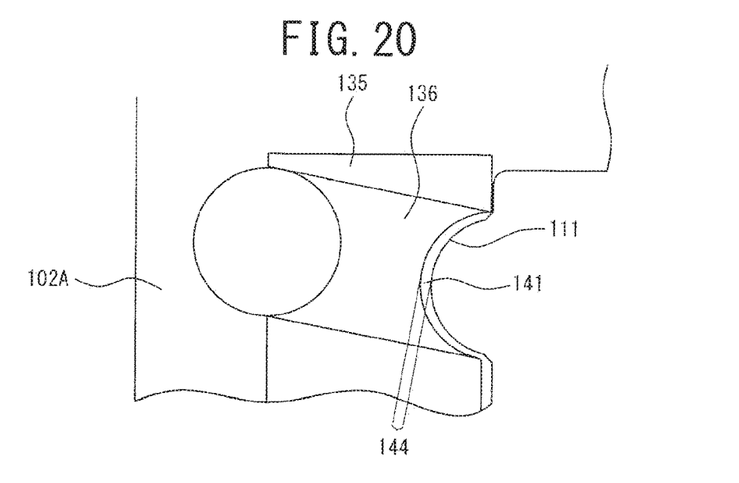
FIG. 20 is an enlarged view of a main part of a linear motion guide device of Comparative Example 1, which illustrates a stepped portion formed at a connection portion between a concave groove of a return guide and a raceway groove of a slider main body.

As depicted in FIG. 20, a concave groove 136 of a return guide 135 is arranged so as to be continued to a raceway groove 111 of a slider main body 102A. However, in the linear motion guide device of Comparative Example 1, the concave groove 136 of the return guide 135 and the raceway groove 111 of the slider main body 102A are not smoothly continued at a connection portion therebetween, and a stepped portion 144 is formed. Now, the stepped portion 144 will be described. As depicted in FIG. 20, over the entire circumference of the raceway groove 111 of the slider main body 102A, a surface of the raceway groove 111 of the slider main body 102A is located to be closer to a curvature center of the raceway groove 111 of the slider main body 102A than a surface of the concave groove 136 of the return guide 135 is. In other words, when the slider main body 102A is viewed from a return guide 135 side, the longitudinal end face 141 of the slider main body 102A is exposed over the entire circumference of the raceway groove 111 of the slider main body 102A.

Figure 21:
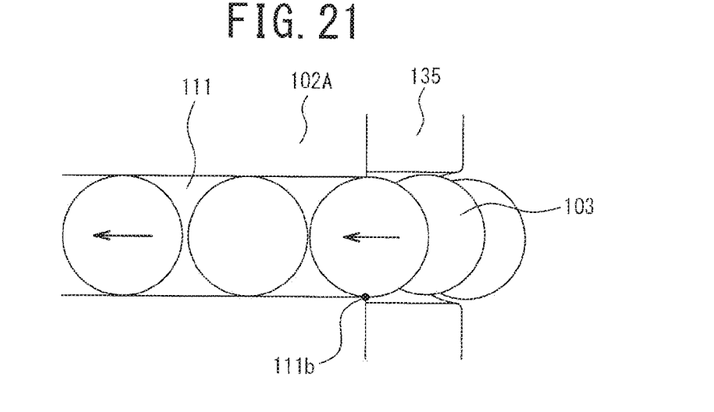
FIG. 21 is an enlarged view of a main part of the linear motion guide device of Comparative Example 1, which illustrates a state of the rolling members entering from a direction changing passage into a rolling passage.
Figure 23:
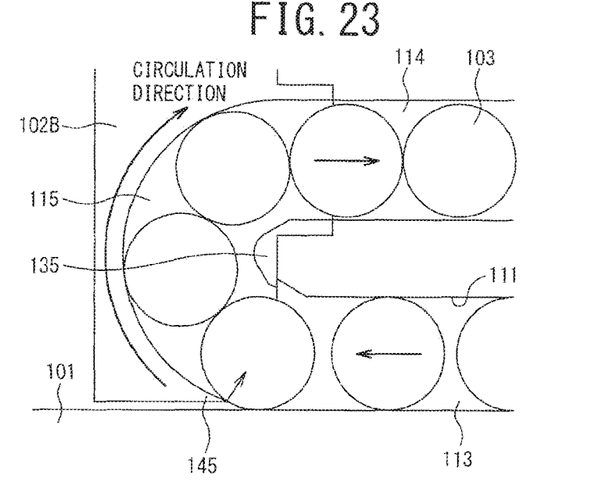
FIG. 23 is an enlarged view of a main part of the linear motion guide device of Comparative Example 2, which illustrates a state of the rolling members being scooped up from the rolling passage.

In a direction changing passage 115, rolling members 103 move in the direction changing passage 115 while meandering right and left in a widthwise direction of the concave groove 136. Due to this, when the rolling members 103 enter from the direction changing passage 115 into a rolling passage 113, the rolling members 103 tend to collide against a surface of a groove shoulder portion on the surface of the concave groove 136 (see FIG. 20) of the return guide 135. Then, over the entire circumference of the raceway groove 111 of the slider main body 102A, the surface of the raceway groove 111 of the slider main body 102A is located on the side closer to the curvature center of the raceway groove 111 of the slider main body 102A than the surface of the concave groove 136 of the return guide 135 is, as a result of which the rolling members 103 when entering into the rolling passage 113 collide against a groove shoulder portion 111b of the raceway groove 111 of the slider main body 102A (see FIGS. 21 and 23). The slider main body 102A is made of steel, and therefore, collision of the rolling members 103 generates large vibration and noise.

Figure 22:
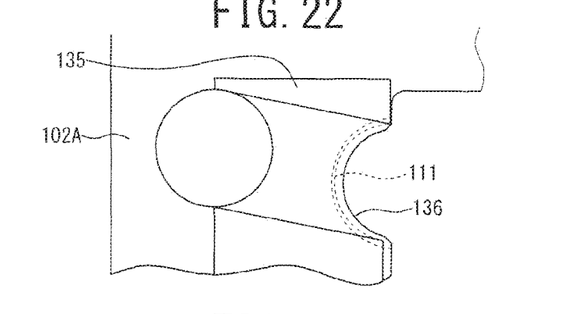
FIG. 22 is an enlarged view of a main part of a linear motion guide device of Comparative Example 2, which illustrates a stepped portion formed at a connection portion between a concave groove of a return guide and a raceway groove of a slider main body.

In addition, in a linear motion guide device of Comparative Example 2, the concave groove 136 of the return guide 135 and the raceway groove 111 of the slider main body 102A are not smoothly continued at a connection portion therebetween, and a stepped portion 144 is formed. Now, the stepped portion 144 will be described. As depicted in FIG. 22, over the entire circumference of the raceway groove 111 of the slider main body 102A, the surface of the concave groove 136 of the return guide 135 is located to be closer to the curvature center of the raceway groove 111 of the slider main body 102A than the surface of the raceway groove 111 of the slider main body 102A is.

In other words, when the return guide 135 is viewed from a slider main body 102A side, an end face of the return guide 135 is exposed over the entire circumference of the raceway groove 111 of the slider main body 102A. On the other hand, when the slider main body 102A is viewed from a return guide 135 side, over the entire circumference of the raceway groove 111 of the slider main body 102A, the longitudinal end face 141 of the slider main body 102A hides behind the return guide 135 and cannot be seen (see FIG. 22).

Figure 24:
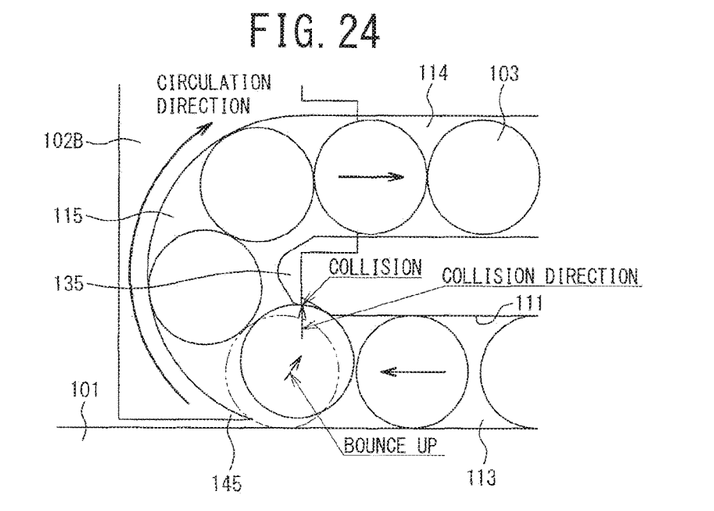
FIG. 24 is an enlarged view of a main part of the linear motion guide device of Comparative Example 2, which illustrates a state of the rolling members entering from the rolling passage into the direction changing passage.

The rolling member 103 having reached the end point of the rolling passage 113 is scooped up from the rolling passage 113 by a tongue portion 145 provided at an end cap 102B and sent to the direction changing passage 115. However, at a time when the rolling member 103 is scooped up, the rolling member 103 bounces up by receiving force in a direction oriented inward the direction changing passage 115 (see FIG. 23). At this time, the rolling member 103 bounced up collides against the return guide 135 (see FIG. 24), and therefore, the collision can hinder the rolling member 103 from smoothly moving. In addition, since the collision point is the corner portion of the return guide 135, large load acts on the return guide 135. Accordingly, when repeatedly collided, the return guide 135 can be damaged.

REFERENCE SIGNS LIST

1 Guide rail
2 Slider
2A Slider main body
2B End cap
3 Rolling member
10 Track groove (guide rail side)
11 Track groove (slider side)
11a Groove bottom portion
11b Groove shoulder portion
13 Rolling passage
14 Return passage
15 Direction changing passage
21 Chamfer
31 Concave portion
33 Return guide fitting concave portion
34 Direction changing passage concave portion
35 Return guide
36 Concave groove
55 Cutting tool
41 End face
43 End face
44 Stepped portion
O Curvature center of raceway groove of slider
O' Curvature center of chamfer

The invention claimed is:

1. A linear motion guide device comprising:
a guide rail;
a slider; and
a plurality of balls that are rolling members; wherein
each of the guide rail and the slider includes a raceway groove having an arc-shaped section at a position facing each other, between the raceway groove of the guide rail and the raceway groove of the slider is formed a rolling passage in which the balls roll,
both of the raceway grooves extend in a longitudinal direction of the guide rail,
the balls are disposed in the rolling passage;
the slider is guided by the guide rail to be movable in the longitudinal direction via rolling of the balls in the rolling passage,
the slider comprises:
a slider main body in which the raceway groove of the slider and a return passage for the balls are provided, the return passage being formed by a through hole substantially parallel to the raceway groove,
an end cap in which a direction changing passage communicating the rolling passage with the return passage is formed and which is detachably fixed to both ends in the longitudinal direction of the slider main body, and
a return guide made of resin fitted into a direction changing passage concave portion formed on a surface of the end cap abutting the slider main body to form the direction changing passage by a guide face for the balls formed on an outer surface thereof and an inner surface of the direction changing passage concave portion, so as to convey and circulate the balls on the return passage and the direction changing passage from an end point to a start point of the rolling passage, and
the guide face of the return guide and the raceway groove of the slider are not smoothly continued at a connection portion, and a stepped portion is formed,
at a groove bottom portion of the raceway groove of the slider and a neighboring portion, a surface of the raceway groove of the slider is located to be closer to a curvature center of the raceway groove of the slider than the guide face of the return guide is, and
at a groove shoulder portion of the raceway groove of the slider and a neighboring portion, the guide face of the return guide is located to be closer to the curvature center of the raceway groove of the slider than the surface of the raceway groove of the slider is.

2. The linear motion guide device according to claim 1, wherein a chamfer is formed at a corner portion continuing in an arc shape formed at a longitudinal end of the raceway groove of the slider.

3. The linear motion guide device according to claim 2, wherein a curvature center of the arc-shaped chamfer is located at a position farther from the groove bottom portion of the raceway groove of the slider than from the curvature center of the raceway groove of the slider.

4. The linear motion guide device according to claim 2, wherein the chamfer is formed by a cutting process using a conical cutting tool, and is formed by contacting a cutter part formed at a side face portion of the cutting tool with the corner portion.

* * * * *